(12) United States Patent
Graham et al.

(10) Patent No.: US 6,312,200 B1
(45) Date of Patent: Nov. 6, 2001

(54) METHOD AND APPARATUS FOR ADJUSTING A TOOL CARTRIDGE, SUCH AS A CUTTER BODY

(75) Inventors: John Graham, Clinton Township; Robert B. Raible, Ortonville; Johann S. Klimach, Clinton Township, all of MI (US)

(73) Assignee: Ex-Cello Machine Tools, Inc., Sterling Heights, MI (US)

( * ) Notice: Subject to any disclaimer, the term of this patent is extended or adjusted under 35 U.S.C. 154(b) by 0 days.

(21) Appl. No.: 09/452,664

(22) Filed: Dec. 1, 1999

(51) Int. Cl.$^7$ .......................... B23B 35/00; B23B 29/034
(52) U.S. Cl. .......................... 408/1 R; 408/161; 408/168
(58) Field of Search .................. 408/1 R, 8, 13, 408/154, 153, 158, 161, 165, 168, 224, 155, 162, 171; 82/1.2, 1.4

(56) References Cited

U.S. PATENT DOCUMENTS

| | | | |
|---|---|---|---|
| 3,740,161 | * 6/1973 | Milewski | 408/168 |
| 4,416,569 | * 11/1983 | Yamakage et al. | 408/161 |
| 4,544,309 | * 10/1985 | Krstovic | 408/168 |
| 4,615,652 | * 10/1986 | Van Sickle et al. | 408/168 |
| 4,867,619 | * 9/1989 | Briggs | 408/168 |

FOREIGN PATENT DOCUMENTS

132403-A * 8/1983 (JP) .

* cited by examiner

*Primary Examiner*—Daniel W. Howell
(74) *Attorney, Agent, or Firm*—Antonelli, Terry, Stout & Kraus, LLP

(57) ABSTRACT

An apparatus for radially adjusting a position of at least one tool cartridge includes a machine tool having rotatable, concentric, elongate, inner and outer drive spindles with at least one pocket formed in the outer drive spindle exposing at least one corresponding portion of the inner drive spindle. A wedge is disposed in each pocket for movement relative to the longitudinal axis of the inner drive spindle and is responsive to relative rotation of the inner drive spindle with respect to the outer drive spindle. Each wedge has a threaded surface operably engageable with either a threaded portion of the inner drive spindle, or a threaded portion of the outer drive spindle. A tool cartridge is operably engaged within each pocket of the outer drive spindle for radial movement relative to the longitudinal axis of the outer drive spindle in response to relative movement of the corresponding wedge. A ring spring is provided for urging each tool cartridge into operable engagement with the corresponding wedge with sufficient strength to maintain operable engagement at maximum rotational speed. A controller is provided for controlling the relative rotation of the inner spindle with respect to the outer spindle in response to at least one input signal. The controller can compensate for wear of a tool connected to the tool cartridge with relative rotation of the inner spindle with respect to the outer spindle. The controller can also adjustably position each tool cartridge with respect to the outer spindle during a machining operation.

20 Claims, 3 Drawing Sheets

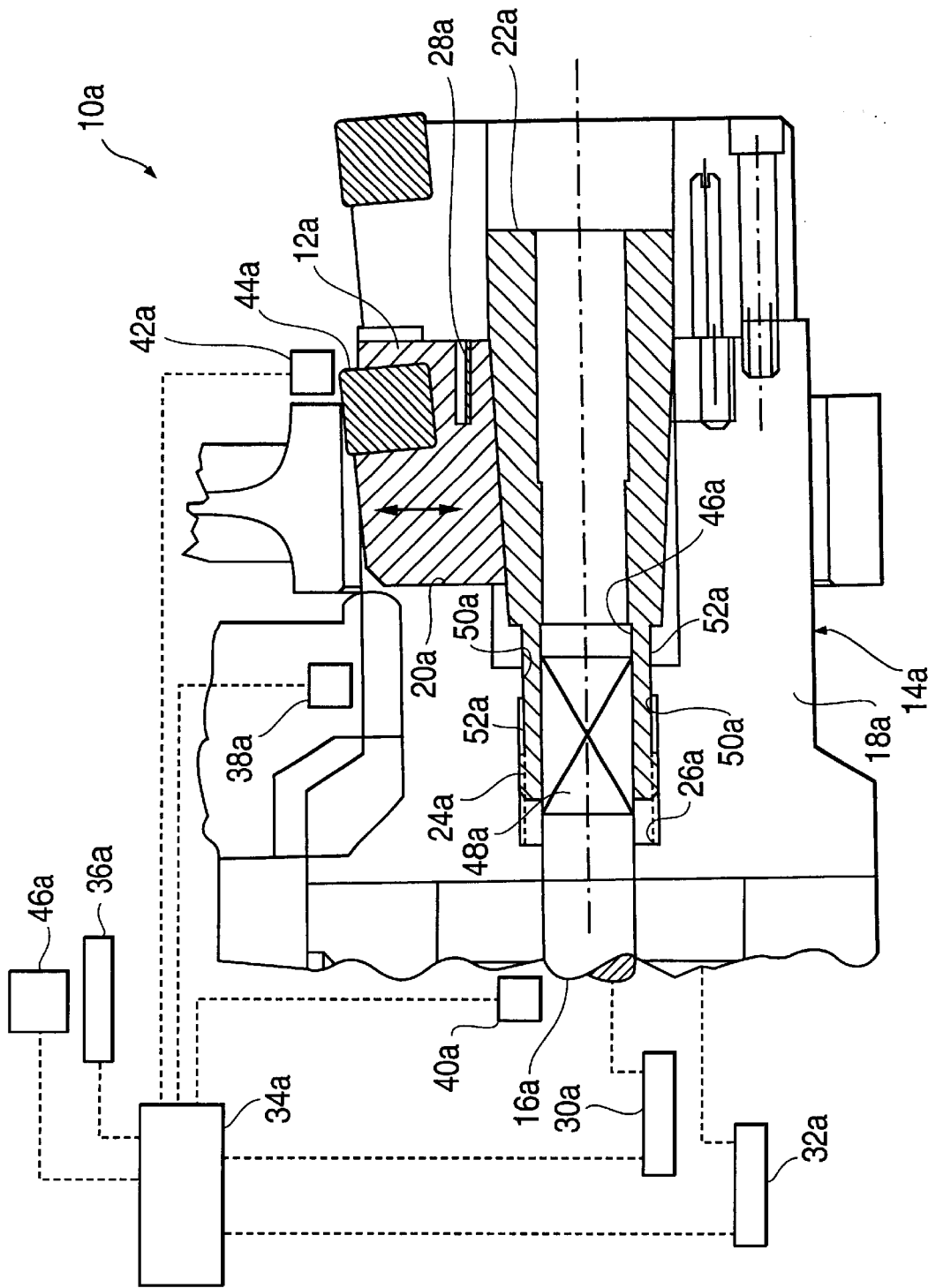

METHOD AND APPARATUS FOR ADJUSTING A TOOL CARTRIDGE, SUCH AS A CUTTER BODY

FIELD OF THE INVENTION

This invention relates to mechanically driven tool compensators, and more particularly, to a tool compensator method and apparatus for a cutting tool having a tool cartridge or body member to be moved radially with respect to a rotating axis of the cutting tool.

BACKGROUND OF THE INVENTION

Electrically driven tool compensators are known for moving a tool between a working position and a retracted position in combination with gaging equipment which signals a predetermined increment of tool travel each time tool adjustment is needed. The tool is movable radially outward and inward in response to an axial movement of a draw bar. An electrical motor with a gear reducer drives a screw nut assembly connected to the draw bar so that the draw bar is moved back and forth along the longitudinal axis of the draw bar, where the direction of movement is determined by the direction of rotation of the motor. The nut is formed to a cylindrical shape and has an interior cavity with a threaded opening. The drive nut is slidably mounted within the housing cavity and a draw bar assembly is removably affixed to the nut so that the draw bar moves axially as the nut rotates. A boring bar is conventionally secured to the draw bar and is operable to provide for radially inward and outward movement of a cutting tool. A cam on the boring bar is operated in response to axial movement of the draw bar in one direction to flex a strip member and thus move the tool radially outwardly toward the workpiece.

The amount of adjustment permitted in known tool compensator configurations is less than the degree of movement desired. In particular, if additional movement could be provided more intricate profiles could be cut. Additional movement could also provide more efficient cutting operation, by allowing multiple cuts to be simultaneously performed at different radial positions at the same time. Accuracy, reliability, and repeatability of the positioning movement of the radially moveable body member is also desirable.

SUMMARY OF THE INVENTION

The present invention discloses a method and apparatus for adjusting a tool cartridge or a cutter body with a drive member, such as an internal screw, operably engaged with a wedge. As the drive member is rotated in either direction, the wedge is driven longitudinally to engage the angled or sloped surface of the tool cartridge or cutter body in order to drive the tool cartridge or cutter body radially inward or outward depending on the direction of rotation. A ring spring is positioned with respect to a periphery, internal or external, of the tool cartridge to hold the individual pieces together. Generally, a tool cartridge or cutter body operates at approximately 3,600 to 4,000 revolutions per minute. In the present invention, the drive member, such as a compensator screw, generally rotates at the same speed as the drive spindle until an adjustment is required. The drive member or compensator screw is driven at a differential speed with respect to the drive spindle in order to move the wedge in the desired direction for controlling the position of the tool cartridge or cutter body.

The present invention provides an apparatus for adjusting at least one tool cartridge or radially moveable body member of a machine tool having rotatable, concentric, elongate, inner and outer drive spindles. The outer drive spindle includes at least one pocket exposing a portion of the inner drive spindle. A wedge is disposed in each pocket for movement relative to the longitudinal axis of the elongate inner drive spindle in response to relative rotation of the inner drive spindle with respect to the outer drive spindle. Each wedge includes a threaded surface, either internal or external, operably engagable with a threaded portion of the inner drive spindle or a threaded portion of the outer drive spindle. A radially moveable body member is operable engaged within each pocket of the outer drive spindle for radial movement relative to the longitudinal axis of the outer spindle in response to relative movement of the corresponding wedge.

The present invention also includes a method for radially adjusting a position of at least one tool cartridge of a machining tool having rotatable, concentric, elongate, inner and outer drive spindles with at least one pocket formed in the outer drive spindle exposing a portion of the inner drive spindle. The method includes the steps of moving at least one wedge disposed in each pocket relative to the longitudinal axis of the elongate inner drive spindle in response to relative rotation of the inner drive spindle with respect to the outer drive spindle. Each wedge has a threaded surface operably engagable with a threaded portion of the inner drive spindle or a threaded portion of the outer drive spindle. The method also includes the step of radially moving at least one tool cartridge operably engaged within each of the pockets of the outer drive spindle relative to the longitudinal axis of the spindle in response to relative movement of the corresponding wedge.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 4 is a partial cross sectional view similar to that shown in FIG. 1 of an alternative configuration of an apparatus for radially adjusting a position of a tool cartridge of a machine tool according to the present invention.

DESCRIPTION OF THE PREFERRED EMBODIMENT

Figure 1:
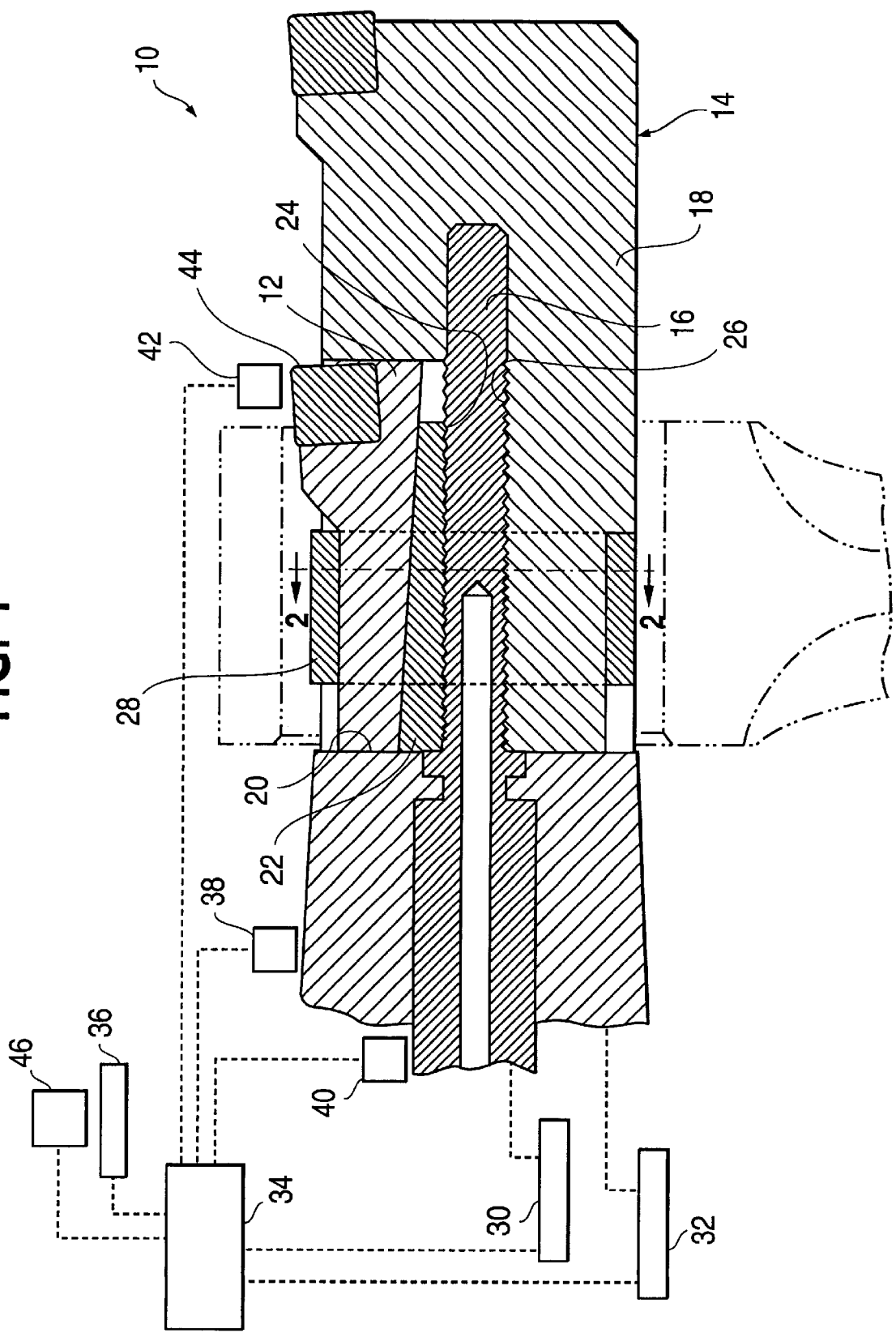
FIG. 1 is a cross sectional view of an apparatus for radially adjusting a position of a tool cartridge of a machine tool according to the present invention.
Figure 2:
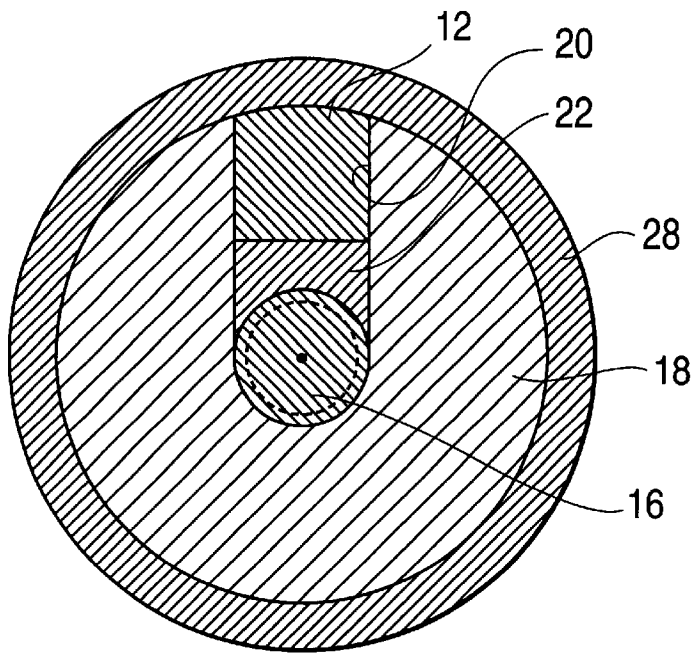
FIG. 2 is a cross sectional view taken as shown in FIG. 1.
Figure 3:
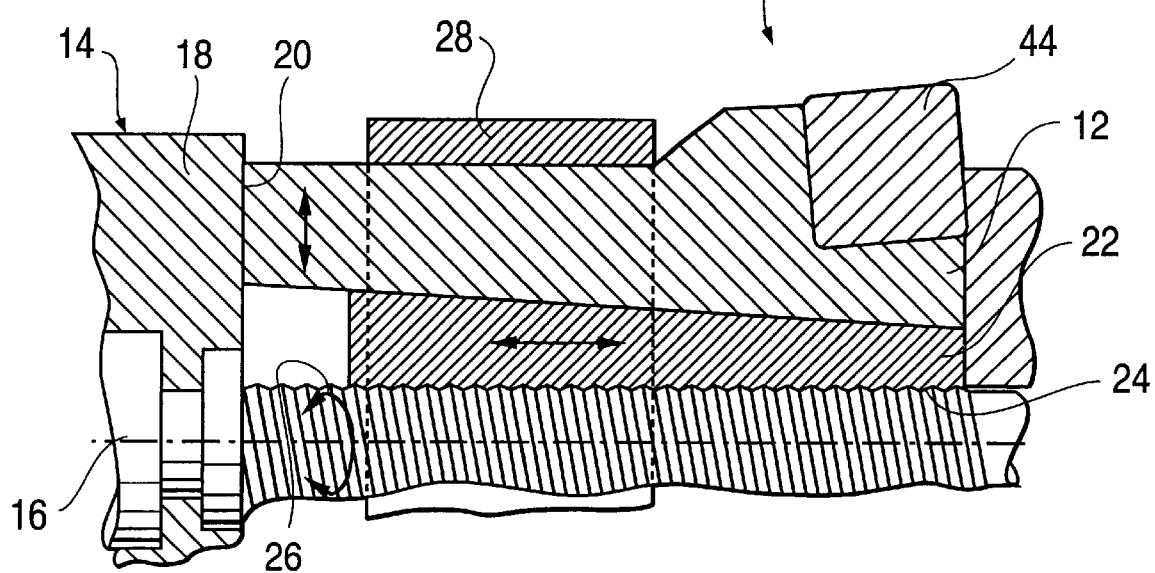
FIG. 3 is a partial cross sectional view similar to that shown in FIG. 1 with the wedge moved from one end limit of travel to an opposite end of limit of travel.

An apparatus 10 according to the present invention radially adjusts a position of at least one tool cartridge 12 of a machine tool 14 as shown in FIGS. 1–3. The machine tool 14 has rotatable, concentric, elongate, inner and outer drive spindles 16, 18 respectively. The outer drive spindle 18 includes at least one pocket 20 extending through the outer drive spindle 18 to expose a portion of the inner drive spindle 16.

A wedge 22 is disposed in each pocket 20 for movement relative to the longitudinal axis of the elongate inner drive spindle 16. Each wedge 22 is moved longitudinally in response to relative rotation of the inner drive spindle 16 with respect to the outer drive spindle 18. Each wedge 22 includes a threaded surface 24 operably engageable with either a threaded portion 26 of the inner drive spindle 16 or a threaded portion of the outer drive spindle. The tool cartridge or body member 12 is operably engaged within each pocket 20 of the outer drive spindle 18 for radial movement relative to the longitudinal axis of the outer drive spindle 18 in response to relative movement of the corresponding wedge 22. A spring 28 is provided for urging each tool cartridge or body member 12 to operably engage with the corresponding wedge 22. The spring 28 preferably is provided in the form of a ring spring as best seen in FIG. 2. The spring 28 urges each tool cartridge 12 into engagement with the corresponding wedge 22, while allowing the tool cartridge 12 to move radially in the pocket 20 as the wedge 22 moves longitudinally in response to relative rotation between the inner drive spindle 16 and the outer drive spindle 18. The spring 28 is selected to be sufficiently strong to maintain operable engagement between each tool cartridge 12, corresponding wedge 22, and threaded portion 26 of the inner drive spindle 16, while the inner drive spindle 16 and outer drive spindle 18 rotate about a common longitudinal axis.

According to the present invention as best seen in FIG. 1, a first drive 30 can be provided for rotating the inner spindle 16, and a second drive 32 can be provided for rotating the outer spindle 18. A controller 34 can be provided for controlling the relative rotation of the inner spindle 16 and the outer spindle 18 in response to at least one input signal. The input signal can be obtained from a user input device, such as a keyboard 36. Alternatively, or additionally, the input signal can include one or more sensors, such as a rotational speed sensor 38 to monitor the rotation of the outer drive spindle 18, and/or a rotational speed sensor 40 for monitoring the rotation of the inner drive spindle 16, and/or a position sensor 42 for monitoring the radial position of at least one tool cartridge 12, or the tool attached thereto. Input signals can also be provided from the first drive 30 and/or second drive 32 to the controller 34. One or more output signals can also be provided from the controller 34. The output signals can include a signal to control the first drive 30 and/or the second drive 32. Alternatively, or additionally, an output signal can be provided from the controller 34 to a data output device 46, such as a storage unit, printer, display, network connection, or the like.

The controller 34 can include a central processing unit for receiving at least one electronic input signal and for generating at least one processed electronic output signal in accordance with a control program stored in memory. The controller 34 can be programmed to compensate for wear of a tool connected to each tool cartridge 12 with relative rotational movement of the inner drive spindle 16 with respect to the outer drive spindle 18. Alternatively, or additionally, the controller 34 can be programmed to adjustably position each tool cartridge 12 with respect to the outer drive spindle 18 during a machining operation in response to an input signal or during a calibration operation performed between machining operations. It is believed that control of the cutter or other tool can provide the capability for forming more intricate machined profiles, and/or provide more efficient machining operations, and/or allow simultaneous machining operations to be performed at different radial positions at the same time. The structure of the present invention can be precisely formed to provide the desired accuracy, reliability, and repeatability of the positioning movement of the radially moveable body member or tool cartridge 12.

By way of example and not limitation, the present invention is illustrated in FIGS. 1 and 3 with a cutter 44 connected to the tool cartridge 12. Preferably, the cutter 44 can be removed and replaced with respect to each tool cartridge 12 as required. It is further envisioned that the tool cartridge 12 can receive a cutter 44 that is indexable with respect to the tool cartridge 12. In the alternative, any other tool required for a particular machining operation to be performed by the apparatus 10 could be mounted to the appropriate tool cartridge 12 according to the present invention.

The present invention also encompasses a method for radially adjusting a position of each tool cartridge 12 of the machine tool 14. The machine 14 according to the present invention has rotatable, concentric, elongate, inner and outer drive spindles 16, 18 respectively. The outer drive spindle 18 includes at least one pocket 20 exposing a portion 26 of the inner drive spindle 16. The method according to the present invention includes the steps of moving the wedge 22 longitudinally within each pocket 20 relative to the axis of the elongate inner drive spindle 16 in response to relative rotation of the inner drive spindle 16 with respect to the outer drive spindle 18. This can best be seen by comparing the position of wedge 22 in FIG. 1 with the position of wedge 22 in FIG. 3, where the wedge 22 is shown moving from a first end limit of travel to a second end limit of travel. Each wedge 22 is preferably provided with a threaded surface 24 operably engagable with either a threaded portion 26 of the inner drive spindle 16 or a threaded portion of the outer drive spindle 18. The method according to the present invention also includes the step of radially moving the tool cartridge or body member 12 operably engaged within the pocket 20 of the outer drive spindle 18 relative to the longitudinal axis of the outer drive spindle 18 in response to relative movement of the wedge 22. The spring 28 is provided for urging the tool cartridge 12 into operable engagement with the wedge 22. The spring 28 preferably is selected with sufficient strength to maintain operable engagement between the tool cartridge 12, wedge 22, and threaded portion 26 of the inner drive spindle 16 while rotating at the maximum operational speed of the machine tool portion 14.

The method according to the present invention also includes the steps of rotating the inner spindle 16 with a first drive 30, while rotating the outer spindle 18 with a second drive 32, and controlling the relative rotation of the inner spindle 16 and the outer spindle 18 in response to at least one input signal with a controller 34. The one or more input signals can be generated by one or more devices selected from a group including a keyboard 36, speed sensor 38,40, drive feedback signal 30,40 and/or position sensor 42. The method can also include the step of receiving at least one electronic input signal with a central processing unit, and generating at least one processed electronic output signal in accordance with a control program stored in memory.

The step of compensating for tool wear with relative rotation movement of the inner spindle 16 with respect to the outer spindle 18 can also be included in the method of the present invention. In addition, the step of adjustably positioning the tool cartridge 12 with respect to the outer spindle 18 during a machining operation in response to an input signal with the controller 34 can be included in the method of the present invention. In the preferred configuration, the present method includes connecting a cutter to the tool cartridge. Removing and replacing the cutter 44 with respect to the tool cartridge 12 is also envisioned in the steps of the present method. The method also encompasses indexing of the cutter 44 with respect to the tool cartridge 12.

Referring now to FIG. 4, an alternative configuration of an apparatus 10a for radially adjusting a position of a tool cartridge 12a of a machine tool 14a according to the present invention is illustrated. The machine tool 14a has rotatable, concentric, elongate, inner and outer drive spindles 16a, 18a respectively. The outer drive spindle 18a includes at least one pocket 20a extending through the outer drive spindle 18a to expose an interior passage for receiving inner drive spindle 16a.

A wedge 22a is disposed in each pocket 20a for movement relative to the longitudinal axis of the elongate inner drive spindle 16a. Each wedge 22a is moved longitudinally in response to relative rotation of the inner drive spindle 16a with respect to the outer drive spindle 18a. Each wedge 22a includes a threaded surface 24a operably engagable with either a threaded portion 26a of the outer drive spindle 18a, or a threaded portion of the inner drive spindle. The tool cartridge or body member 12a is operably engaged within each pocket 20a of the outer drive spindle 18a for radial movement relative to the longitudinal axis of the outer drive spindle 18a in response to relative movement of the corresponding wedge 22a. A spring 28a is provided for urging each tool cartridge or body member 12a to operably engage with the corresponding wedge 22a. The spring 28a preferably is provided in the form of a ring spring. The spring 28a urges each tool cartridge 12a into engagement with the corresponding wedge 22a, while allowing the tool cartridge 12a to move radially in the pocket 20a as the wedge 22a moves longitudinally in response to relative rotation between the inner drive spindle 16a and the outer drive spindle 18a. The spring 28a is selected to be sufficiently strong to maintain operable engagement between each tool cartridge 12a and the corresponding wedge 22a, while the inner drive spindle 16a and outer drive spindle 18a rotate about a common longitudinal axis.

A first drive 30a can be provided for rotating the inner drive spindle 16a, and a second drive 32a can be provided for rotating the outer drive spindle 18a. A controller 34a can be provided for controlling the relative rotation of the inner drive spindle 16a and the outer drive spindle 18a in response to at least one input signal. Input signal can be obtained from a user input device, such as a keyboard 36a. Alternatively, or additionally, the input signal can include one or more sensors, such as a rotational speed sensor 38a to monitor the rotation of the outer drive spindle 18a, and/or a rotational speed sensor 40a for monitoring the rotation of the inner drive spindle 16a, and/or a position sensor 42a for monitoring the radial position of at least one tool cartridge 12a, or the tool attached thereto. Input signals can also be provided from the first drive 30a and/or second drive 32a to the controller 34a. One or more output signals can also be provided from the controller 34a. The output signals can include a signal to control the first drive 30a and/or the second drive 32a. Alternatively, or additionally, an output signal can be provided from the controller 34a to a data output device 46a, such as a storage unit, printer, display, network connection, or the like.

The controller 34a can include a central processing unit for receiving at least one electronic input signal and for generating at least one processed electronic output signal in accordance with a control program stored in memory. The controller 34a can be programmed to compensate for wear of a tool connected to each tool cartridge 12a with relative rotational movement of the inner drive spindle 16a with respect to the outer drive spindle 18a. Alternatively, or additionally, the controller 34a can be programmed to adjustably position each tool cartridge 12a with respect to the outer drive spindle 18a during a machining operation in response to an input signal or during a calibration operation preformed between machining operations. It is believed that control of the cutter 44a or other tool can provide the capability for forming more intricate machine profiles, and/or providing more efficient machining operations, and/or allowing simultaneous machining operations to be preformed at different radial positions at the same time. The structure of the present invention can be precisely formed to provide the desired accuracy, reliability, and repeatability of the positioning movement of the radially movable body member or tool cartridge 12a.

The wedge 22a can include a shaped recess or aperture 46a adapted to receive a complementary shaped end portion 48a of the inner drive spindle 16a. The end portion 48a of the inner drive spindle 16a is operably engaged within the shaped aperture 46a of the wedge 22a in order to drivingly engage the wedge 22a in rotation about a common longitudinal axis with the inner drive spindle 16a. Engagement of the end portion 48a of the inner drive spindle 16a with the shaped aperture 46a allows longitudinal movement of the wedge 22a with respect to the inner drive spindle 16a as the wedge 22a and inner drive spindle 16a rotate together. The relative longitudinal movement of the wedge 22a is a result of different rotational speeds between the inner drive spindle 16a and the outer drive spindle 18a which causes the threaded portion 24a of the wedge 22a to operably engage and interact with the threaded portion 26a of the outer drive spindle 18a. Depending on the difference in rotational speed between the inner drive spindle 16a and the outer drive spindle 18a, the wedge 22a is driven longitudinally in either direction. As illustrated in FIG. 4, the wedge 22a is illustrated in an intermediate position between the first and second end limits of travel. The first and second longitudinal end limits of travel of the wedge 22a can be defined by the radially inwardly extending ridge or collar 50a disposed within the groove or recess 52a of the wedge 22a.

The invention has been described with respect to a first drive 30, 30a for the inner spindle 16, 16a and a second drive 32, 32a for the outer spindle 18, 18a it is envisioned that a single drive could be provided for providing rotation of the inner spindle 16, 16a and outer spindle 18, 18a while incremental, differential movement of the inner drive spindle 16, 16a with respect to the outer drive spindle 18, 18a could be provided with a second drive. Furthermore, it is envisioned that the present invention can include an automatic tool compensation sequence between machining operations on the workpieces. By way of example, and not limitation, the position sensor 42, 42a can provide a feedback signal to the controller 34, 34a or central processing unit, to enable accurate adjustment of the cutter 44, 44a position prior to the start of the next machining operation. The compensating adjustment step can occur during idle time of the machine tool while a workpiece or part is removed from the workstation and a new workpiece or part is delivered. Such modifications to the disclosed and illustrated configurations are envisioned as part of the present invention.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for radially adjusting a position of at least one tool cartridge of a machine tool having rotatable, concentric, elongate, inner and outer drive spindles with at least one pocket formed in the outer drive spindle exposing at least a portion of the inner drive spindle, the apparatus comprising:

a wedge disposed in each pocket for movement relative to the longitudinal axis of the elongate inner drive spindle in response to relative rotation of the inner drive spindle with respect to the outer drive spindle, each wedge having a threaded surface operably engageable with a threaded portion of one of the inner drive spindle and the outer drive spindle; and at least one tool cartridge operably engaged within each pocket of the outer drive spindle for radial movement relative to the longitudinal axis of the outer drive spindle in response to relative movement of the corresponding wedge.

2. The apparatus of claim 1 further comprising:

a spring for urging each tool cartridge to operably engage the corresponding wedge.

3. The apparatus of claim 1 further comprising:

a first drive for rotating the inner spindle;

a second drive for rotating the outer spindle; and a controller for controlling the relative rotation of the inner spindle and the outer spindle in response to at least one input signal.

4. The apparatus of claim 1 further comprising:

a central processing unit for receiving at least one electronic input signal and for generating at least one processed electronic output signal in accordance with a control program stored in memory.

5. The apparatus of claim 1 further comprising:

a controller for compensating for wear of a tool connected to each tool cartridge with relative rotational movement of the inner drive spindle with respect to the outer drive spindle.

6. The apparatus of claim 1 further comprising:

a controller for adjustably positioning the tool cartridge with respect to the outer drive spindle during a machining operation in response to an input signal.

7. A method for radially adjusting a position of at least one tool cartridge of a machine tool having rotatable, concentric, elongate, inner and outer drive spindles with at least one pocket formed in the outer drive spindle exposing at least portion of the inner drive spindle, the method comprising the steps of:

moving a wedge disposed in each pocket relative to the longitudinal axis of the elongate inner drive spindle in response to relative rotation of the inner drive spindle with respect to the outer drive spindle, each wedge having a threaded surface operably engageable with a threaded portion of one of the inner drive spindle and the outer drive spindle; and radially moving at least one tool cartridge operably engaged within each pocket of the outer drive spindle relative to the longitudinal axis of the spindle in response to relative movement of the corresponding wedge.

8. The method of claim 7 further comprising the step of:

urging each tool cartridge to operably engage the corresponding wedge with a spring.

9. The method of claim 7 further comprising the steps of:

rotating the inner spindle with a first drive;

rotating the outer spindle with a second drive; and controlling the relative rotation of the inner spindle and the outer spindle in response to at least one input signal with a controller.

10. The method of claim 7 further comprising the step of:

receiving at least one electronic input signal with a central processing unit; and generating at least one processed electronic output signal in accordance with a control program stored in memory.

11. The method of claim 7 further comprising the step of:

compensating for tool wear with relative rotational movement of the inner spindle with respect to the outer spindle.

12. The method of claim 7 further comprising the step of:

adjustably positioning each tool cartridge with respect to the outer spindle during a machining operation on in response to an input signal with a controller.

13. An apparatus for radially adjusting a position of at least one tool cartridge comprising:

a machine tool having rotatable, concentric, elongate, inner and outer drive spindles with at least one pocket formed in the outer drive spindle exposing at least a portion of the inner drive spindle;

a wedge disposed in each pocket for movement relative to the longitudinal axis of the elongate inner drive spindle in response to relative rotation of the inner drive spindle e with respect to the outer drive spindle, each wedge having a threaded surface operably engageable with a threaded portion of one of the inner drive spindle and the outer drive spindle;

at least one tool cartridge operably engaged within each pocket of the outer drive spindle for radial movement relative to the longitudinal axis of the spindle in response to relative movement of the corresponding wedge; and a ring spring for urging each tool cartridge to operably engage the corresponding wedge.

14. The apparatus of claim 13 further comprising:

a controller for controlling the relative rotation of the inner spindle and the outer spindle in response to at least one input signal, the controller for compensating for wear of a tool connected to each tool cartridge with relative rotational movement of the inner spindle with respect to the outer spindle, and the controller for adjustably positioning at least one tool cartridge with respect to the outer spindle during a machining operation.

15. In an apparatus for radially adjusting a position of at least one tool cartridge of a machine tool having rotatable, concentric, elongate, inner and outer drive spindles with at least one pocket formed in the outer drive spindle exposing at least a portion of the inner drive spindle, the improvement comprising:

a wedge disposed in each pocket for movement relative to the longitudinal axis of the elongate inner drive spindle in response to relative rotation of the inner drive spindle with respect to the outer drive spindle;

a threaded interface between the wedge and one of the inner drive spindle and the outer drive spindle, the threaded interface operably engageable to longitudinally move the wedge with respect to the pocket in response to relative rotation between the inner drive spindle and the outer drive spindle; and at least one tool cartridge operably engaged within each pocket of the outer drive spindle for radial movement relative to the longitudinal axis of the outer drive spindle in response to relative movement of the corresponding wedge.

16. The improvement of claim 15 further comprising:

a spring for urging each tool cartridge to operably engage the corresponding wedge.

17. The improvement of claim 15 further comprising:

a first drive for rotating the inner spindle;

a second drive for rotating the outer spindle; and a controller for controlling the relative rotation of the inner spindle and the outer spindle in response to at least one input signal.

18. The improvement of claim 15 further comprising:

a central processing unit for receiving at least one electronic input signal and for generating at least one processed electronic output signal in accordance with a control program stored in memory.

19. The improvement of claim 15 further comprising:

a controller for compensating for wear of a tool connected to each tool cartridge with relative rotational movement of the inner drive spindle with respect to the outer drive spindle.

20. The improvement of claim 15 further comprising:

a controller for adjustably positioning the tool cartridge with respect to the outer drive spindle during a machining operation in response to an input signal.

* * * * *